United States Patent [19]

Grotendorst

[11] Patent Number: 5,054,553

[45] Date of Patent: Oct. 8, 1991

[54] METHOD OF UNDERGROUND-WATER EXPLORATION DURING WELL-CONSTRUCTION BY HYDRAULIC-SYSTEM DRILLING

[75] Inventor: Gerhard Grotendorst, Borken, Fed. Rep. of Germany

[73] Assignee: Terratronic GmbH, Munich, Fed. Rep. of Germany

[21] Appl. No.: 392,963

[22] PCT Filed: Nov. 29, 1987

[86] PCT No.: PCT/DE87/00558

§ 371 Date: Aug. 1, 1989

§ 102(e) Date: Aug. 1, 1989

[87] PCT Pub. No.: WO88/04352

PCT Pub. Date: Jun. 16, 1988

[30] Foreign Application Priority Data

Dec. 3, 1986 [DE] Fed. Rep. of Germany ....... 3641306
Apr. 23, 1987 [DE] Fed. Rep. of Germany ....... 3713577

[51] Int. Cl.$^5$ ..................... E21B 43/04; E21B 43/10
[52] U.S. Cl. ....................................... 166/278; 166/51
[58] Field of Search ................. 166/278, 369, 378, 51, 166/68.5, 105, 106, 134, 135, 191, 192

[56] References Cited

U.S. PATENT DOCUMENTS

| 3,374,836 | 3/1968 | Gribbin | 166/51 |
| 3,455,387 | 7/1969 | Peters | 166/51 X |
| 3,812,911 | 5/1974 | Vann | 166/135 |
| 4,046,198 | 9/1977 | Gruesbeck et al. | 166/278 |
| 4,669,536 | 6/1987 | Ames et al. | 166/68 |
| 4,669,540 | 6/1987 | Luoma et al. | 166/135 |
| 4,681,163 | 7/1987 | Guidry et al. | 166/278 |

Primary Examiner—William P. Neuder
Attorney, Agent, or Firm—Herbert Dubno

[57] ABSTRACT

An annular passage defined by a peripheral walls of pipe segments connected together and a wall of a drill formed in a rock is filled with a filtering medium protruding above the upper edge of a perforated low pipe segment and interacting with a flushing fluid filling the rest of the annular space forming thereby a seal preventing the hydraulic communication between a water originated at a level of the rock to be explored and a water from other levels located above the seal.

5 Claims, 2 Drawing Sheets

METHOD OF UNDERGROUND-WATER EXPLORATION DURING WELL-CONSTRUCTION BY HYDRAULIC-SYSTEM DRILLING

CROSS REFERENCE TO RELATED APPLICATIONS

This application is a National Phase Application of PCT/DE87/00558 filed Nov. 29, 1987 and based, in turn, on German National Application P 36 41 306.2 of Dec. 3, 1986 and P 37 13 577.5 of Apr. 23, 1987 under the International Convention.

FIELD OF THE INVENTION

The invention relates to a method of underground-water exploration.

BACKGROUND OF THE INVENTION

The German Patent 35 12 709 describes a generic method for the construction of wells in unstable rock, whereby between the filter gravel introduced in the area of the filter-pipe segment, referred to hereinafter simply as the "filter pipe", and the remaining portion of the annular space between the lengthening-pipe segment, hereinafter referred to simply as the "lengthening pipe", and the inner wall of the drill hole, a pumpable permanent-plastic or permanent-elastic seal is introduced. The annular space between the lengthening pipe and the inner wall of the drill hole is filled and sealed for sample taking.

With this known method a water sample can be taken only in the area of the actual filter pipe and the water bearing strata which may possibly exist above the filter pipe are hermetically and hydraulically sealed off from the openings in the filter pipe, due to the sealing of the annular space between the inner walling of the drill hole and the lengthening pipe.

The known method has the disadvantage that with this kind of well construction via hydraulic-system drilling, it is not possible to extract water in water-bearing rock strata with poor load-carrying capacity, since when the filter pipe is located in a water-bearing stratum which is loaded with noxious substances, it is necessary to redrill the entire drill hole. Before that, it is necessary to extract the filter pipes and the lengthening pipes. However, the extraction of lengthening pipes is almost impossible to perform, since due to the friction between the sealing material filling the annular space and the outside of the lengthening pipe, such a resistance against the extraction motion is created, that the drill holes are normally destroyed and collapse.

U.S. Pat. No. 4,366,862 describes equipment with which it is possible in sturdy mountain rock to define an underground area via spaced-apart packers, which can be pressed against the walling of the drill hole, in order to take out a sample of the liquid. Packers can be used only in sturdy rock. In rock that is not sturdy, where it is necessary to work with additives to the hydraulic drill fluid in order to stabilize the drill-hole wall, the packers destroy not only the stabilizing coating on the drill-hole wall, but also the drill-hole wall itself.

OBJECT OF THE INVENTION

It is the object of the invention to provide a method of underground-water exploration, which makes it possible to check any desired layer during the drilling of a well for the quality of the water-bearing stratum, without having to plaster the annular space between the lengthening-pipe segment and the walling of the drill hole and without having to fill sealing means into the annular space above the filter layer between the lower end of the lengthening-pipe segment and the drill-hole wall.

According to the invention a filter-pipe segment with an upwardly thereto connected lengthening-pipe segment are introduced at a distance from the drill-hole wall, and then filter gravel is introduced as a filtering layer into the annular space between the drill-hole wall and the filter-pipe segment, until the filter gravel protrudes over the top edge of the filter-pipe segment and fills the annular space between the drill-hole wall and the filter-pipe segment.

The invention provides that the annular space between the filter-pipe segment and the drill-hole wall is first filled with a filtering layer consisting of filter sand, preferably with a grain size of 0.3 to 0.7 or 0.7 to 1.2 mm, i.e. with a filter sand within the range of core-sand, and that after that water from the area of the filter-pipe segment is slowly pumped out, for the purpose of water-sample taking.

In other words, the invention proposes that, during the drilling of a bore hole for the purpose of exploration of underground waters at any desired level to be checked, a filter pipe is used, to which upwardly the lengthening pipes known per se are connected. The annular space between the inner walling of the drill hole and the outside of the filter pipe is then filled with a sand-core fill, which has a certain grain size as mentioned. Thus, the fill by a certain measure lies above the upper end of the filter pipe and the lower end of the lengthening pipe and after that, in the annular space between the lengthening pipe and the inner wall of the drill hole, there is only the flushing liquid from the drilling process with the additives stabilizing the wall of the drill hole.

If through the filter pipe, which is to be considered an auxiliary filter pipe, water is slowly and carefully pumped, the use of the fine-grained, but still sufficiently water-permeable sand-core fill in the annular space between the filter pipe and the inner wall of the drill hole forms a satisfactory seal at the upper end of the annular-space fill. This seal is no longer artificially provided, but is achieved by the sedimentation of fine substances, partially from the additives to the flushing liquid and partially from the abrasion of fine particles from the wall of the drill hole. The uppermost areas of the fill are continuously being added to, which makes it impermeable to water in these upper areas, but at the same time it remains water-permeable below this region, so that the water to be tested from the water-bearing stratum can pass through the filtering layer, without making possible a connection between this water layer and the upper area of the drill hole, where the lengthening pipes with the flushing liquid are located.

In accordance with the invention, it is also possible to improve this seal by introducing into the flushing liquid further flushing additives which are expandable sealing substances in powder or granulated form.

The method according to the invention allows the limitation of the individual drill-hole segments to be checked to the height of the filter pipe built into the lower portion of the bore-hole casing, whereby a considerably stronger differentiation can be achieved than with the heretofore-known exploration techniques for the determination of the water composition.

After the well is pumped clear, a water sample can be immediately taken.

Thus, it is no longer required to fill the further annular space existing above the aforedescribed sealing level in the annular space. The seal is so tight, that the drilling and flushing water in the upwardly rising drill-hole segment has no hydraulic access to the well via the filter pipe. This is proven by the fact that the liquid level in the annular space between the lengthening pipe and the inner walling of the bore hole, remains constant without further external supply.

Since a water-table lowering-funnel is avoided, i.e. vertical flow passages are sealed off, the possibility of a supply of mixed waters from several water-bearing strata during water testing is eliminated, no hydraulic connection between the rock and the wall of the well.

In accordance with a modified embodiment, the invention also makes use of a particular type of drill-pipe line, wherein in the lower portion, above the actual drill head, a filter pipe segment is provided, which has a smaller outer diameter than the outer diameter of the drill head. In the annular space created this way between the top edge of the drill head, of the filter pipe and the inner wall of the drill hole, a filtering layer fill with a grain size of 0.3-0.7, or 0.7-1.2 mm is introduced. Here, there is also an automatic contribution by the upper annular area to the fill, due to the fine-grained components of the drill flushing-liquid, and a control only in the area of the water to be aspired in the area of the drill head is possible, whereby naturally the drill head and the line of drill pipes serve as conveying pipe.

In a further embodiment of the invention it is possible to introduce into the bore hole, together with the drill equipment, one or more shut-off plugs and catching devices, whose segments are pressed or rammed into the wall of the drill hole, so that the annular space between the outer wall of the line of drill pipes and the inner walling of the drill hole is tightly sealed.

This plugging and trapping device can be inserted above the drill head, with or without filter pipe.

BRIEF DESCRIPTION OF THE DRAWING

The above and other objects, features and advantages of my invention will become more readily apparent from the following description, reference being made to the accompanying highly diagrammatic drawing in which:

In FIG. 1, the rock is represented at 1, and the drill hole being sunk therein is represented at 2. In the drill hole 2 a filter pipe 4, which can consist of various individual filter-pipe segments, is inserted, coming to rest on the drill-hole bottom 3, a lengthening pipe 5 which can consist of various individual lengthening-pipe segments, being connected thereto.

Figure 1:
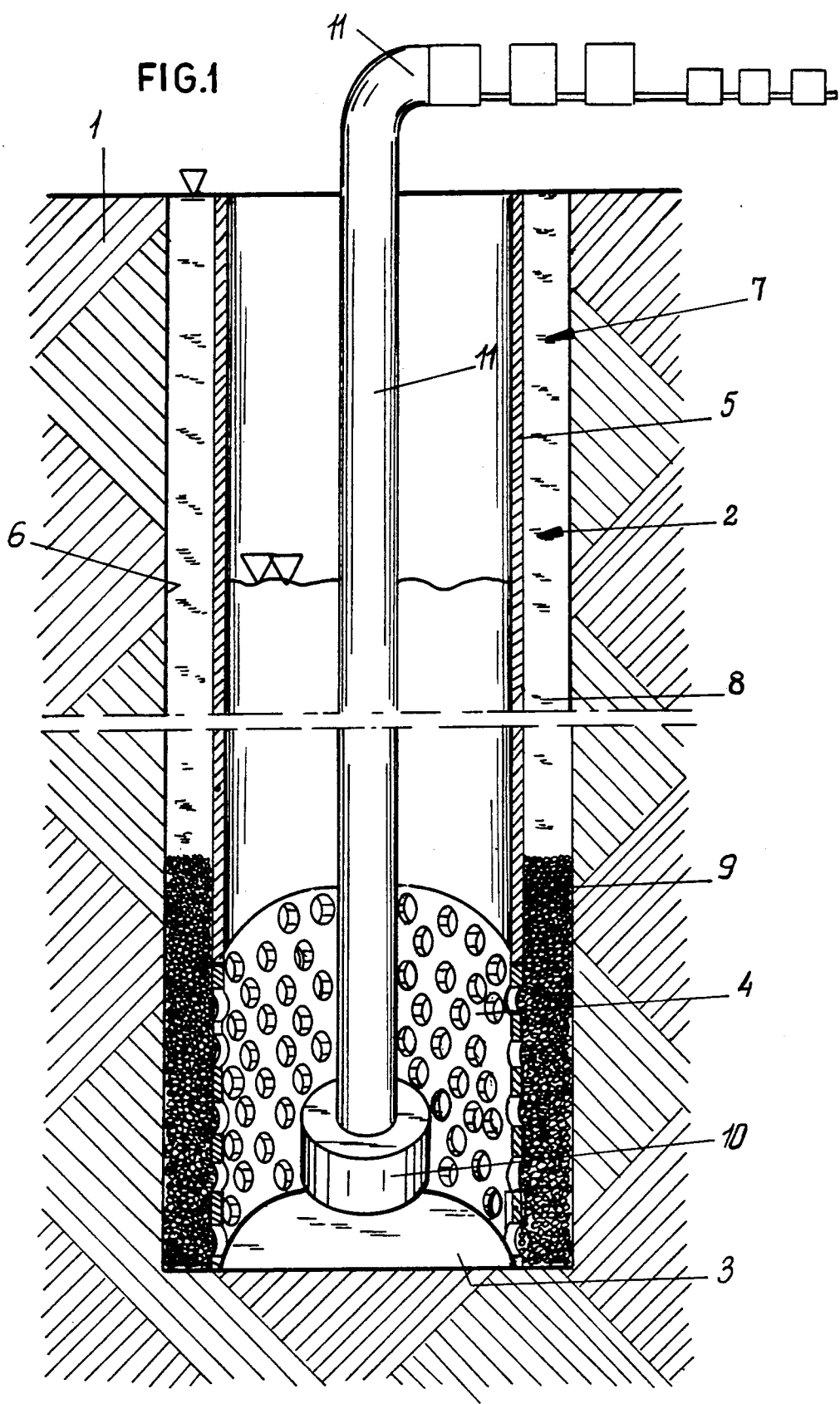
FIG. 1 is a schematic cross sectional view of a first embodiment illustrating the method according to the invention.

Between the lengthening pipe 5 and the actual wall 6 of the drill hole, an annular space 7 is formed, which in the shown embodiment is filled with the flushing liquid 8.

In the area of the filter pipe 4, a sand-core fill 9 is introduced, preferably of a grain size of 0.3-0.7, or 0.7 to 1.2 mm, whereby this fill protrudes upwardly, rising above the bottom edge of the lengthening pipe by for instance 1 to 1.5 m.

A pump 10 is connected with a pump 11, to which filter installation 12 and electronic measuring equipment 14 can (FIG. 2) be connected.

By operating pump 10, the water in the lengthening pipe 5 is aspirated and at the same time water coming from the rock stratum wherein the filter pipe 4 is located can flow into the drill hole 2. As a result of the negative pressure created in this way, sediments of fine-grained substances, partially coming from the additives used in the drill fluid, partially from the abrasion of fine particles from the wall of the drill hole, add to the uppermost areas of the fill in the segment, where this area is still surrounded on the inside by the lengthening pipe 5.

Thus, in a surprising manner a complete sealing of the upper annular area of the sand-core fill 9 takes place, thereby preventing a hydraulic connection between the flushing liquid 8 in the annular space 7 and the annular space between the filter pipe 4 and the wall of the drill hole, so that the pump 10 can aspirate only the water in the filter pipe 4, originating from the same rock stratum wherein the filter pipe 4 is located.

Figure 2:
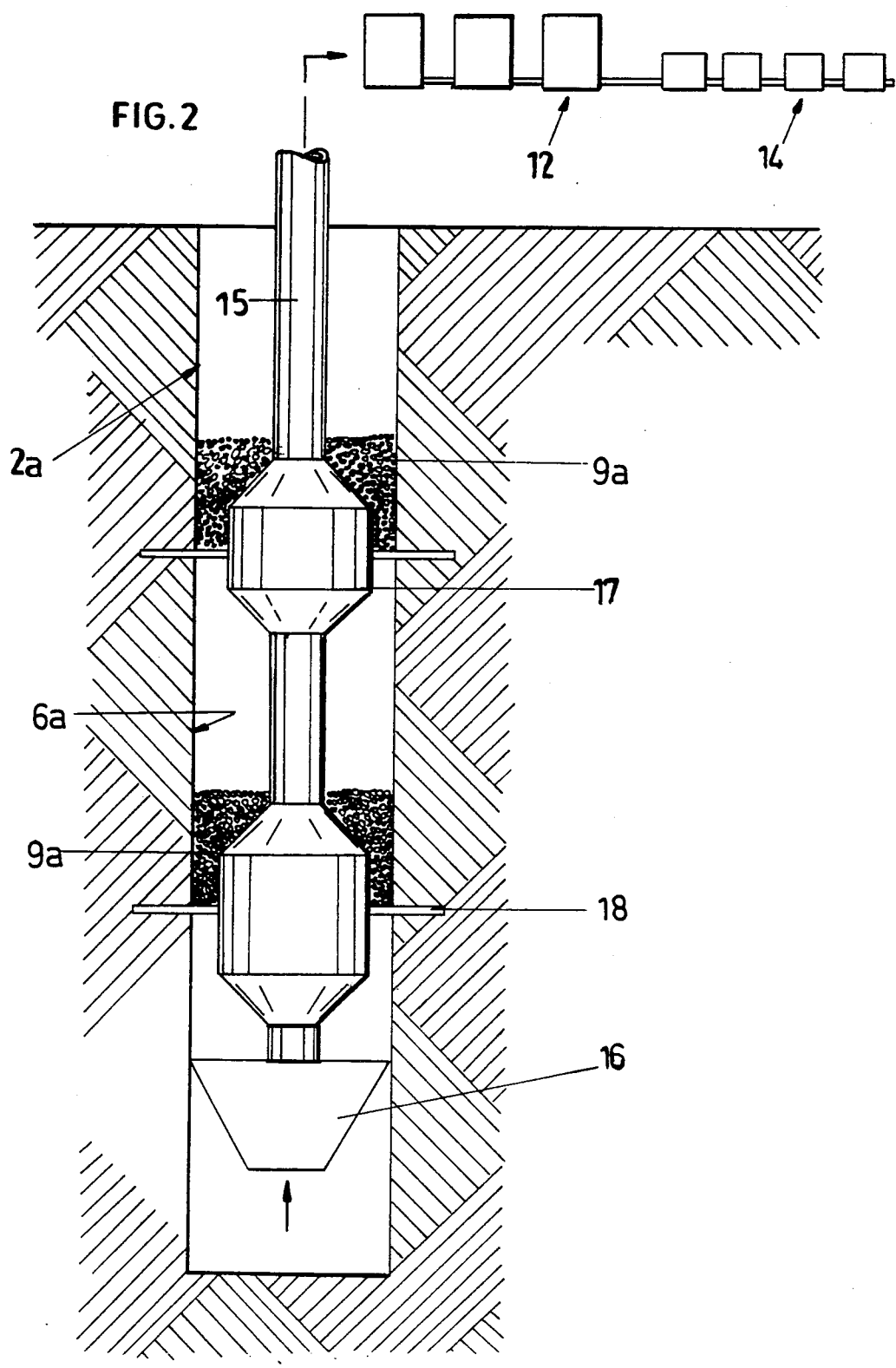
FIG. 2 is a similar view of a second embodiment illustrating the method according to the invention.

In the embodiment shown in FIG. 2, shut-off plugs and catching devices 17 and 18 are arranged in a drill hole 2a in connection with the line of pipes 15 for the drill bit 16, which creates a seal with respect to the drill-hole wall 6a.

For instance, after lifting the drill pipes 15 by a corresponding length of for instance 1 to 2 m, the locking devices 17 and 18 can be driven out, and they press into the drill-hole wall 6a.

The plugging and catching devices 17 and 18 are mechanical units, which, for instance, can be driven via an auxiliary drive unit. Such mechanical units are shown in FIG. 2 and they can consist of thin, disk-like segments, which are pressed into the surrounding wall of the drill hole by the corresponding rotation of the drill pipes. When water is extracted from below the plugging- and catching devices 17 and 18 it is insured that only the water originating from the area below the plugging and catching devices is conveyed, whereby the drill bit 16 and the drill pipes 15 function as the conveying duct.

The distance between the plugging and catching devices 17 and 18 can be established in accordance with the local rock conditions.

Additionally, as shown in FIG. 2, on the plugging and catching devices 17 or 18 a corresponding sand-core fill 9a, or 9b can be provided, whereby this fill also consists of grain sizes of 0.3-0.7, resp. 0.7-1.2 mm.

When the pump is in operation, the underground water partially mixed with flushing liquid and fine-grained particles, is continuously aspired and, and as soon as the water is sufficiently purified, the test can be started. Preferably, the testing takes then place using electronic or chemical, measuring devices.

In order to avoid excessive pressure on the plugging and catching devices 17 and 18 and to avoid a hydraulic short circuit with the neighboring water-bearing strata, the extraction of water is limited to the region below the plugging and catching devices 17 and 18, depending on the structure of the respective rock. It is solely a matter of testing samples in order to establish whether the respective impacted rock stratum supplies an unobjectionable and satisfactory water.

The water sample extracted this way from any desired drilling depth reflects exactly the physico-chemical or microbacteriological water parameters for the determination of the water quality of the water-bearing stratum it was extracted from. A mixing of the underground water with water from other water-bearing strata is not possible, due to the provided seal and the small quantity of the extracted sample.

In order to prevent a collapse of the drill-hole wall 6a, the drill-hole wall can be stabilized with known flushing-liquid additives in accordance with the rock structure, during the extraction of the water sample below the plugging and catching devices 17 and 18.

I claim:

1. A method of exploring underground water comprising the steps of:

drilling a longitudinal bore extending downwardly in subterranean strata from a ground surface to a water-bearing stratum, said bore being formed with an inner peripheral wall and a bottom;

inserting a filter-pipe segment having an upper end into said bore and connecting an elongated extension-pipe segment thereto at said upper end and extending upwardly toward said surface, said segments forming an annular space directly with said inner peripheral wall;

filling said annular space with a filtering layer including a filter sand having a grain size of 0.3 mm to 0.7 mm or 0.7 mm to 1.2 mm to a level higher than said upper end of said filter-pipe segment so that said filtering layer of said filter sand completely bridges between said wall and said filter-pipe segment over an entire length of the filter-pipe segment;

introducing flushing water mixed with flushing additives and entraining fine-grain particles forming sealing material into said annular space above said filtering layer;

introducing a pump into an interior of said filter-pipe segment and pumping water out of said filter-pipe segment with said pipe to draw said flushing water through said filter layer and form an annular seal by deposition of said sealing material on at least a surface of said filtering layer located higher than said upper end of said filter-pipe segment; and thereafter slowly pumping out of said segment a water to be analyzed originating solely from said water-bearing stratum in the vicinity of said filter-pipe segment and penetrating into said interior of said filter-pipe segment through said filtering layer, said water originating from the water-bearing stratum being hydraulically sealed from said flushing water by said seal.

2. The method defined in claim 1 wherein said filtering layer protrudes above said upper edge by approximately 1 to 1.5 meter and the water is pumped out for analysis at a rate of about 1.5 to 2.5 m$^3$/h.

3. The method defined in claim 1 wherein said filter-pipe segment is formed with slots of a width between 0.3 to 1.0 mm.

4. The method defined in claim 1, further comprising a step of continuously adding said sealing material into said flushing water while extracting said water to be analyzed from said interior, so that a level of said flushing water in said annular space is constant.

5. A well construction comprising:

a bore drilled in subterranean strata extending along an axis downwardly from a ground surface, said bore being formed with an inner peripheral wall of said subterranean strata and with a bottom;

a filter-pipe segment inserted in said bore, resting on said bottom and formed with an upper edge, said filter-pipe segment being provided with a perforated peripheral wall between said bottom and said upper edge extending over a height of a water-bearing stratum to be evaluated;

an elongated lengthening pipe segment connected with said upper edge and extending upwardly therefrom toward said surface, said lengthening pipe segment being formed with a respective peripheral wall, said segments being coaxial with said bore, said perforated and peripheral walls of the pipe segments being juxtaposed directly with said inner peripheral wall of said subterranean strata and forming an annular space there with;

a filtering layer of a filter sand having a grain size of 0.3 mm to 0.7 mm or 0.7 mm to 1.2 mm filling said space from said bottom to a height of substantially 1 to 1.5 m above said upper edge of said filter-pipe segment and in direct contact with said filter-pipe segment and said inner peripheral wall of said bore over an entire height of said layer, said annular space being filled with a flushing liquid mixed with a swellable sealing material between said layer and said surface, said sealing material forming an annular seal on said layer for preventing mixing of the flushing liquid with a water to be analyzed originating in said water-bearing stratum and entering into an interior of said filter-pipe segment through said layer and through said perforated peripheral wall; and a pump in said filter-pipe segment connected by a pipe running to said surface through said pipe segments for pumping water out of said filter-pipe segment.

* * * * *